Dec. 30, 1941.    M. HANSSEN    2,268,393
FLOOR SCRAPER
Filed Oct. 14, 1939
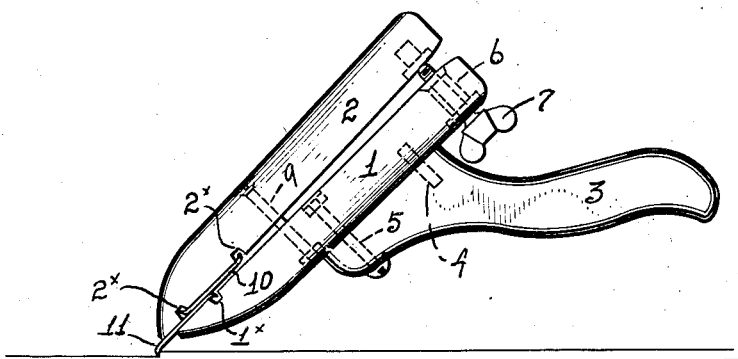
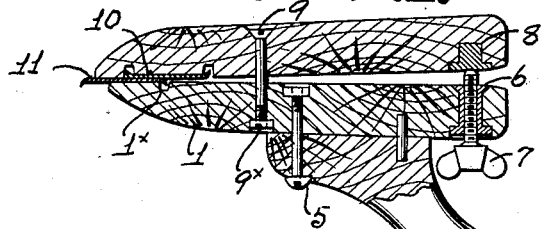
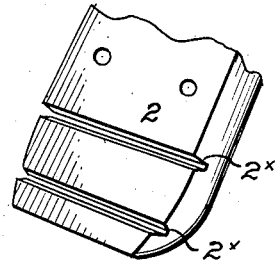
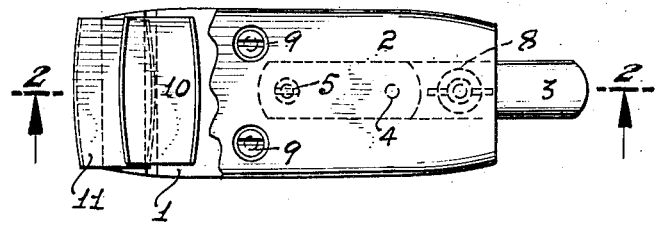
INVENTOR.
Margo Hanssen
BY
W. Lee Helms
ATTORNEY.

UNITED STATES PATENT OFFICE 2,268,393

FLOOR SCRAPER

Mangor Hanssen, Freeport, N. Y.

Application October 14, 1939, Serial No. 299,456

1 Claim. (Cl. 30—171)

The object of the present invention is to provide a scraper for floors and for wood surfaces generally adapted to hold a spare blade in such manner that the blade acts as a bearing or clamping surface for the blade actually in position for use, the two blades being mounted in staggered relation between the primary holding elements of the scraper.

The invention will be described with reference to the accompanying drawing, in which:

Figure 1 is a side elevation of an embodiment of the invention, certain parts being shown in dotted lines, the scraper being in position for use as shown by a surface line meeting the scraping blade.

Figure 2 is a longitudinal section through the two primary holding members and part of the handle of the embodiment illustrated in Figure 1.

Figure 3 is a bottom plan view of the structure, partly broken away.

Figure 4 is a fragmentary view of the front portion of the upper primary holding member.

Figure 5 is a perspective view of a cutting blade adapted for use in the device.

Referring to Figure 1, I have shown at 1 a lower primary blade holding member of the device, the upper member being shown at 2. The lower member is held upon a handle 3 by means of a stud 4 and a nut and bolt connecting element 5. At its rear end member 1 is apertured to receive an internally threaded sleeve 6 for the thumb screw 7.

The upper primary clamping member is provided with an inset metallic abutment 8 to receive the end of thumb screw 7 and is apertured to receive two screws 9, Figure 3, which screws pass down into equivalent but slightly larger apertures in clamping member 1, the ends thereof being threaded to receive nuts $9x$ (Figure 2). The screws 9 have a loose fit in the receiving apertures of member 1 so that a rocking motion may be given to the upper member 8 by operating thumb screw 7.

The upper primary clamping member 2 at its front lower face is formed with two transversely extending channelways at $2x$ to receive angularly extending cutting edges of a scraper blade formed in the manner shown more particularly in Figures 1, 2 and 5.

The blade received in the channelways $2x$ is a reserve or spare blade 10. When the two clamping members 1 and 2 are in position, the second blade 11 positioned for active use will have its flanged cutting edge disposed in a channelway at $1x$ formed in clamping member 1, and the spare blade will lie over upon blade 11 and will serve as a bearing member therefor to receive the stresses imparted by means of the thumb screw 7 and transmit them to blade 11 so that the latter will firmly be held in position. The face area of clamping member 2 intermediate the two channelways $2x$ will be reduced in depth equivalent to the thickness of the blade 10 so that the outer or exposed face of the blade 10 will be flush with the lower face of member 2.

Having described my invention, what I claim and desire to secure by Letters Patent, is as follows:

A floor scraper comprising a lower member consisting of a clamping plate and a handle secured thereto, the lower member projecting forwardly and rearwardly of the handle and a threaded aperture being formed in the rearwardly projecting portion, a thumb screw threaded in said aperture and adapted to be projected above the upper face of said clamping plate, an upper clamping member having a rocking connection with the lower clamping member, said rocking connection comprising two springy screws passing through both clamping members forwardly of the handle, one of the clamping members being formed with a transversely extending channel to receive the cutting flanged marginal edge of a blade.

MANGOR HANSSEN.